United States Patent
Yu et al.

(10) Patent No.: US 10,629,902 B2
(45) Date of Patent: Apr. 21, 2020

(54) POSITIVE ACTIVE MATERIAL FOR RECHARGEABLE LITHIUM BATTERY, METHOD OF PREPARING THE SAME, AND POSITIVE ELECTRODE FOR RECHARGEABLE LITHIUM BATTERY AND RECHARGEABLE LITHIUM BATTERY INCLUDING THE SAME

(71) Applicant: Samsung SDI Co., Ltd., Yongin-si, Gyeonggi-Do (KR)

(72) Inventors: Byong-Yong Yu, Yongin-si (KR); Jay-Hyok Song, Yongin-si (KR); Jun-Seok Park, Yongin-si (KR); Andrei Kapylou, Yongin-si (KR); Chang-Wook Kim, Yongin-si (KR); Yong-Chan You, Yongin-si (KR); Sun-Ho Kang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 600 days.

(21) Appl. No.: 14/301,201

(22) Filed: Jun. 10, 2014

(65) Prior Publication Data
US 2015/0010823 A1  Jan. 8, 2015

(30) Foreign Application Priority Data
Jul. 3, 2013 (KR) ........................ 10-2013-0077907

(51) Int. Cl.
| | | |
|---|---|---|
| *H01M 4/505* | (2010.01) | |
| *H01M 4/525* | (2010.01) | |
| *H01M 4/58* | (2010.01) | |
| *C01G 53/00* | (2006.01) | |
| *C01D 15/04* | (2006.01) | |
| *C01D 15/02* | (2006.01) | |
| *H01M 4/131* | (2010.01) | |
| *H01M 4/1315* | (2010.01) | |
| *H01M 10/0525* | (2010.01) | |
| *H01M 4/13915* | (2010.01) | |
| *H01M 4/485* | (2010.01) | |
| *H01M 4/1391* | (2010.01) | |

(52) U.S. Cl.
CPC ............ *H01M 4/505* (2013.01); *C01D 15/02* (2013.01); *C01D 15/04* (2013.01); *C01G 53/50* (2013.01); *H01M 4/525* (2013.01); *H01M 4/582* (2013.01); *C01P 2002/50* (2013.01); *C01P 2002/52* (2013.01); *C01P 2002/72* (2013.01); *C01P 2004/03* (2013.01); *C01P 2004/32* (2013.01); *H01M 4/131* (2013.01); *H01M 4/1315* (2013.01); *H01M 10/0525* (2013.01)

(58) Field of Classification Search
CPC .... H01M 4/505; H01M 4/131; H01M 4/1391; H01M 4/485; H01M 4/525; H01M 4/582; H01M 10/0525; C01D 15/02; C01D 15/04

USPC .......................................................... 429/223
See application file for complete search history.

(56) References Cited

U.S. PATENT DOCUMENTS

| | | | |
|---|---|---|---|
| 6,087,042 A | 7/2000 | Sugiyama et al. | |
| 7,205,072 B2 | 4/2007 | Kang et al. | |
| 7,314,682 B2 | 1/2008 | Thackeray et al. | |
| 8,187,752 B2 | 5/2012 | Buckley et al. | |
| 2004/0091779 A1* | 5/2004 | Kang ................... | C01G 53/006 429/231.1 |
| 2007/0122703 A1 | 5/2007 | Whitfield et al. | |
| 2010/0086853 A1 | 4/2010 | Venkatachalam et al. | |
| 2010/0086854 A1 | 4/2010 | Kumar et al. | |
| 2011/0052981 A1* | 3/2011 | Lopez ................ | C01G 45/1257 429/206 |
| 2011/0052990 A1 | 3/2011 | Yanagida et al. | |
| 2011/0111298 A1 | 5/2011 | Lopez et al. | |
| 2011/0151336 A1 | 6/2011 | Lee et al. | |
| 2011/0163272 A1* | 7/2011 | Ono ..................... | H01M 4/0416 252/500 |
| 2011/0226985 A1 | 9/2011 | Park et al. | |
| 2011/0244331 A1 | 10/2011 | Karthikeyan et al. | |
| 2012/0003542 A1 | 1/2012 | Konishi et al. | |
| 2012/0064410 A1* | 3/2012 | Kim .................... | C01G 45/1228 429/223 |
| 2012/0145954 A1 | 6/2012 | Endo et al. | |
| 2012/0213920 A1 | 8/2012 | Yanagita et al. | |
| 2012/0276446 A1 | 11/2012 | Kawai | |
| 2012/0301786 A1 | 11/2012 | Takamuku et al. | |
| 2013/0015396 A1 | 1/2013 | Terashima | |
| 2013/0078520 A1 | 3/2013 | Toya et al. | |
| 2013/0108921 A1 | 5/2013 | Kase et al. | |
| 2013/0168599 A1* | 7/2013 | Kato ................... | C01G 45/1228 252/182.1 |
| 2013/0189581 A1 | 7/2013 | Imaizumi et al. | |
| 2013/0209871 A1* | 8/2013 | Kato ................... | C01G 45/1228 429/199 |
| 2014/0234716 A1 | 8/2014 | Lopez et al. | |

FOREIGN PATENT DOCUMENTS

| | | |
|---|---|---|
| CN | 102005605 A | 4/2011 |
| CN | 102177605 A | 9/2011 |

(Continued)

OTHER PUBLICATIONS

English translation of Hosoya, JP 2006344425 A, dated Dec. 2006, Japan.*

(Continued)

*Primary Examiner* — Sin J Lee
(74) *Attorney, Agent, or Firm* — Knobbe Martens Olson & Bear LLP

(57) ABSTRACT

In an aspect, a positive active material for a rechargeable lithium battery including overlithiated layered oxide (OLO), a method of preparing the same, and a positive electrode for a rechargeable lithium battery and a rechargeable lithium battery including the same is disclosed.

2 Claims, 11 Drawing Sheets

(56) References Cited

FOREIGN PATENT DOCUMENTS

| | | | | |
|---|---|---|---|---|
| CN | 102315434 | A | 1/2012 | |
| CN | 102544506 | A | 7/2012 | |
| CN | 102760872 | A | 10/2012 | |
| CN | 103053051 | A | 4/2013 | |
| JP | 10-177860 | A | 6/1998 | |
| JP | 2002-208401 | A | 7/2002 | |
| JP | 2006344425 | A * | 12/2006 | |
| JP | 2007-220475 | A | 8/2007 | |
| JP | 2007-503102 | A | 12/2007 | |
| JP | 4706090 | B2 | 3/2011 | |
| JP | 2011-154997 | A | 8/2011 | |
| JP | 2012-028163 | A | 2/2012 | |
| JP | 2012-38561 | A | 2/2012 | |
| JP | 2012-504316 | A | 2/2012 | |
| JP | WO 2012017811 | A1 * | 2/2012 | C01G 45/1228 |
| JP | WO 2012017826 | A1 * | 2/2012 | C01G 45/1228 |
| JP | 2012-142154 | A | 7/2012 | |
| JP | 2012-201587 | A | 10/2012 | |
| JP | 2012-204307 | A | 10/2012 | |
| JP | 2012-252964 | A | 12/2012 | |
| JP | 2013-010677 | A | 1/2013 | |
| JP | 2013-503450 | A | 1/2013 | |
| JP | 2013-033759 | A | 2/2013 | |
| JP | 2013-511129 | A | 3/2013 | |
| JP | 2013-080603 | A | 5/2013 | |
| KR | 10-0999109 | B1 | 12/2010 | |
| KR | 10-2012-0026312 | A | 3/2012 | |
| KR | 10-2012-0096425 | A | 8/2012 | |
| KR | 10-2013-0009739 | A | 1/2013 | |
| KR | 10-2013-0033155 | A | 4/2013 | |
| WO | WO 2011/114534 | A1 | 9/2011 | |
| WO | WO 2011/122448 | A1 | 10/2011 | |
| WO | WO 2012/017811 | A1 | 2/2012 | |

OTHER PUBLICATIONS

J.W. Fergus, "Recent developments in cathode materials for lithium ion batteries," *Journal of Power Sources,* 195 (2010) 939-954.

P. He et al., "Layered lithium transition metal oxide cathodes towards high energy lithium-ion batteries," *J. Mater. Chem.,* 2012, 22, 3680-3695.

K.S. Park et al., "Effect of Li ion in transition metal sites on electrochemical behavior of layered lithium manganese oxides solid solutions," *Solid State Ionics,* 171 (2004) 141-146.

M.M. Thackeray et al., "$Li_2MnO_3$-stabilized $LiMO_2$ (M = Mn, Ni, Co) electrodes for lithium-ion batteries," *J. Mater. Chem.,* 2007, 17, 3112-3125.

M.S. Whittingham, "Lithium Batteries and Cathode Materials," *Chem. Rev.,* 2004, vol. 104, No. 10, 4271-4301.

H. Yu et al., "Initial Coulombic efficiency improvement of the $Li_{1.2}Mn_{0.567}Ni_{0.166}Co_{0.067}O_2$ lithium-rich material by ruthenium substitution for manganese," *J. Mater. Chem.,* 2012, 22, 15507-15510.

H. Yu et al., "High-Energy Cathode Materials ($Li_2MnO_3$—$LiMO_2$) for Lithium-Ion Batteries," *J. Phys. Chem. Lett.,* 2013, 4, 1268-1280.

Gao et al., "High capacity $Li[Li_{0.2}Mn_{0.54}Ni_{0.13}CO_{0.13}]O_2$—$V_2O_5$ composite cathodes with low irreversible capacity loss for lithium ion batteries," *Electrochemistry Communications* 11 (2009) 84-86.

Partial European Search Report dated Jan. 5, 2015 for European Patent Application No. EP 14 175 626.2, which shares priority of Korean Patent Application No. KR 10-2013-0077907 with captioned U.S. Appl. No. 14/301,201.

Extended European Search Report dated Apr. 23, 2015 for European Patent Application No. EP 14 175 626.2, which shares priority of Korean Publication No. KR 10-2013-0077907 with captioned U.S. Appl. No. 14/301,201.

Communication Pursuant to Article 94(3) EPC—Examination Report dated May 18, 2016 for European Patent Application No. EP 14 175 626.2 which shares priority of Korean Patent Application No. KR 10-2013-0077907 with subject U.S. Appl. No. 14/301,201, 4 pages.

Korean Office Action dated Jan. 17, 2017 for Korean Patent Application No. KR 10-2013-0077907 and from which subject U.S. Appl. No. 14/301,201 claims priority.

Chinese First Office Action dated Oct. 26, 2017 for Chinese Patent Application No. CN 201410315857.2, and which shares priority of Korean Patent Application No. KR 10-2013-0077907 with subject U.S. Appl. No. 14/301,201.

Chinese Office Action dated May 10, 2018 for Chinese Patent Application No. CN 201410315857.2 and which shares priority of Korean Patent Application No. KR 10-2013-0077907 with subject U.S. Appl. No. 14/301,201.

Japanese Office Action dated May 21, 2018 for Japanese Patent Application No. JP 2014-137508 and which shares priority of Korean Patent Application No. KR 10-2013-0077907 with subject U.S. Appl. No. 14/301,201.

Third Chinese Office Action dated Nov. 1, 2018 for Chinese Patent Application No. CN 201410315857.2, which shares priority of Korean Patent Application No. KR 10-2013-0077907 with subject U.S. Appl. No. 14/301,201. No new references are cited in the Chinese Office Action.

* cited by examiner

POSITIVE ACTIVE MATERIAL FOR RECHARGEABLE LITHIUM BATTERY, METHOD OF PREPARING THE SAME, AND POSITIVE ELECTRODE FOR RECHARGEABLE LITHIUM BATTERY AND RECHARGEABLE LITHIUM BATTERY INCLUDING THE SAME

INCORPORATION BY REFERENCE TO RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0077907 filed in the Korean Intellectual Property Office on Jul. 3, 2013, the disclosure of which is incorporated herein by reference in its entirety.

BACKGROUND

Field

This disclosure relates to a positive active material for a rechargeable lithium battery, a method of preparing the same, and a positive electrode for a rechargeable lithium battery and a rechargeable lithium battery including the same.

Description of the Related Technology

Lithium rechargeable batteries have recently drawn attention as a power source for small portable electronic devices, and use an organic electrolyte. A lithium battery may have twice or more discharge voltage than a conventional battery using an alkaline aqueous solution, and accordingly have high energy density.

A rechargeable lithium battery may be manufactured by injecting an electrolyte into a battery cell, which includes a positive electrode including a positive active material capable of intercalating/deintercalating lithium ions and a negative electrode including a negative active material capable of intercalating/deintercalating lithium ions.

As for the positive active material, $LiCoO_2$ has been widely used but has a limit for increase of energy density and output characteristics due to reversible capacity of less than or equal to 200 mAh/g. In particular, when the $LiCoO_2$ is used in a high energy density-applying field, the $LiCoO_2$ may be structurally unstable and deform during the charge.

However, an overlithiated layered oxide (OLO) including lithium as a composite of $Li_2MnO_3$ and $Li(Ni/Co/Mn)O_2$ shows high charge and discharge capacity at a high voltage.

However, an OLO rarely is applied to a commercially available battery as a positive active material due to capacity deterioration and voltage drop, as charge and discharge are repeated.

SUMMARY

One embodiment provides a positive active material for a rechargeable lithium battery having high capacity and improved cycle-life characteristics at high voltage, and capable of suppressing a voltage drop.

Another embodiment provides a method of preparing the positive active material for a rechargeable lithium battery.

Yet another embodiment provides a positive electrode for a rechargeable lithium battery including the positive active material.

Still another embodiment provides a rechargeable lithium battery including the positive electrode.

One embodiment provides a positive active material for a rechargeable lithium battery including overlithiated layered oxide (OLO) represented by the following Chemical Formula 1.

  Chemical Formula 1 wherein, $1.1<a<1.5$, $0<b<1$, $0\leq c<1$, $0<d<1$, $0<e<1$, and $0.8\leq b+c+d+e<1$, and M is a cation element of V, Ga, Zr, Mg, Al, Ti, Cr, Fe, W, Mo, Si, or a combination thereof.

Another embodiment provides a positive active material for a rechargeable lithium battery including an overlithiated layered oxide (OLO) represented by the following Chemical Formula 2.

  Chemical Formula 2 wherein, $1.1<a<1.5$, $0<b<1$, $0\leq c<1$, $0<d<1$, $0<e<1$, $0<f<1$ and $0.8\leq b+c+d+e<1$, M is a cation element of V, Ga, Zr, Mg, Al, Ti, Cr, Fe, W, Mo, Si, or a combination thereof, and M' is an anion element of F, S, Cl, Br, or a combination thereof.

In some embodiments of the above Chemical Formula 1, $1.1<a<1.5$, $0<b<1$, $0\leq c<1$, $0<d<1$, $0.002\leq e\leq 0.03$ and $0.8\leq b+c+d+e<1$.

In some embodiments of the above Chemical Formula 2, $1.1<a<1.5$, $0<b<1$, $0\leq c<1$, $0<d<1$, $0.002\leq e\leq 0.03$, $0.01\leq f<1$, and $0.8\leq b+c+d+e<1$.

In some embodiments of the above Chemical Formulae 1 and 2, M may be V, Ti, W, Si, or a combination thereof, and specifically V.

In some embodiments, the overlithiated layered oxide may be a particle having spherical shape, and the particle may have an average particle diameter (D50) of about 2 μm to about 20 μm.

Some embodiments provide a method of preparing a positive active material for a rechargeable lithium battery that includes mixing a nickel (Ni) source, a manganese (Mn) source, and a cation doping material (M) source to obtain a source mixture; dispersing the source mixture to obtain a dispersed material; drying the dispersed material to obtain a cation-doped precursor; mixing the cation-doped precursor and lithium (Li) source to obtain a mixture; and heat-treating the mixture overlithiated layered oxide (OLO) represented by the above Chemical Formula 1.

Some embodiments provide a method of preparing a positive active material for a rechargeable lithium battery that includes mixing a nickel (Ni) source, a manganese (Mn) source, and a cation doping material (M) source to obtain a source mixture; dispersing the source mixture to obtain a dispersed material; drying the dispersed material to obtain a cation-doped precursor; mixing the cation-doped precursor, a lithium (Li) source, and an anion doping material (M') source to obtain a mixture; and heat-treating the mixture to obtain overlithiated layered oxide (OLO) represented by the above Chemical Formula 2.

In some embodiments, the source mixture may be obtained by further mixing a cobalt (Co) source.

In some embodiments, the cation doping material (M) source may be mixed in an amount of about 1 mol % to about 3 mol % based on total amount of the source mixture.

In some embodiments, the anion doping material (M') source may be mixed in an amount of about 1 parts by mole to about 11 parts by mole based on 100 parts by mole of the source mixture.

In some embodiments, the dispersing may be performed using a milling method.

In some embodiments, the drying may be performed using a spray drying method.

In some embodiments, the heat-treating may be performed at a temperature of about 600° C. to about 900° C.

Some embodiments provide the positive electrode including a positive active material for a rechargeable lithium battery.

Some embodiments provide a rechargeable lithium battery including the positive electrode; a negative electrode; and an electrolyte.

Exemplary embodiments are included in the following detailed description.

A rechargeable lithium battery having high capacity and improved cycle-life characteristics at high voltage, and capable of suppressing a voltage drop may be realized by the embodiments disclosed and described herein.

DETAILED DESCRIPTION

Figure 1:
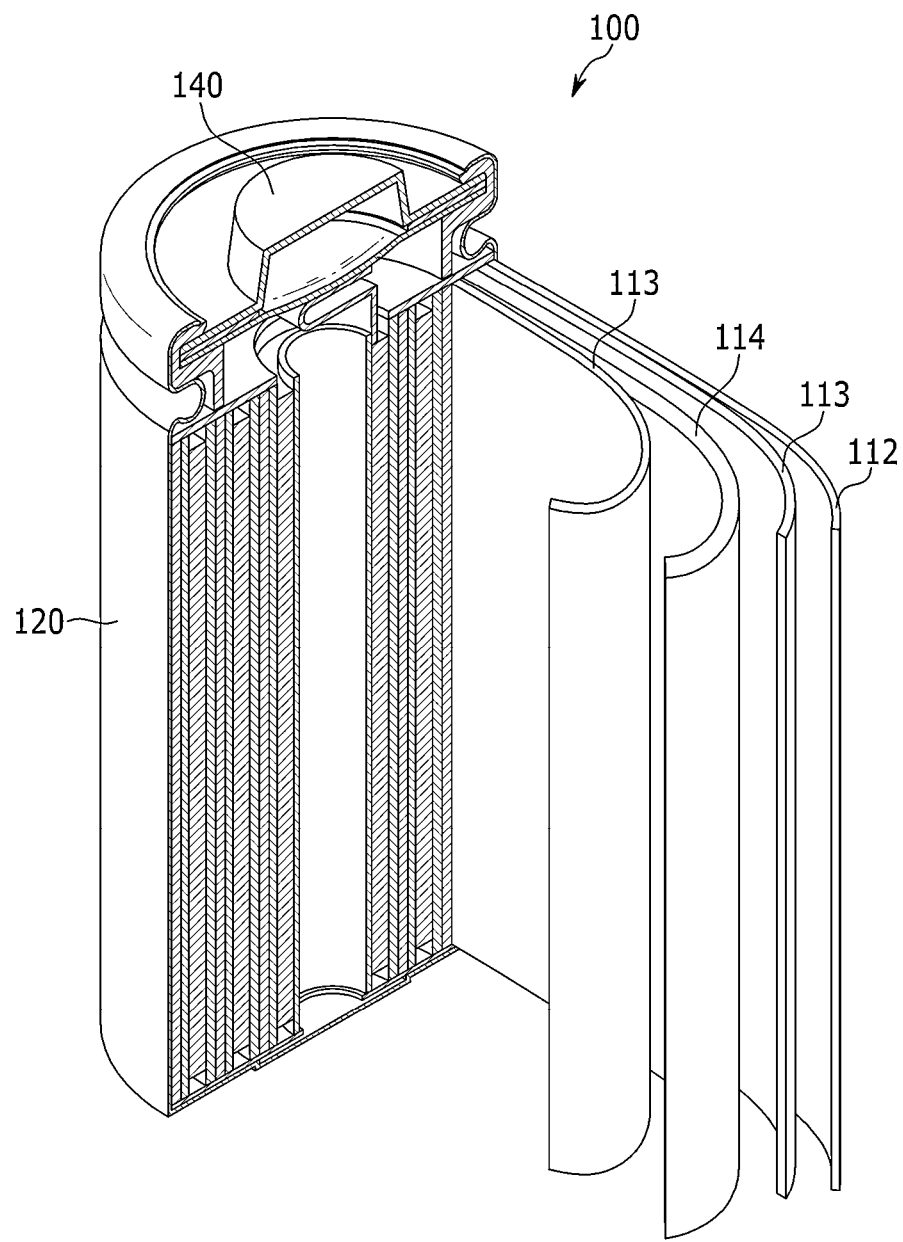
FIG. 1 is a schematic view of a rechargeable lithium battery according to embodiments disclosed and described herein.

Hereinafter, embodiments are described in detail. However, these embodiments are exemplary, and this disclosure is not limited thereto.

An overlithiated layered oxide (OLO) used as a positive active material for a rechargeable lithium battery may have a nano-composite structure of $Li_2MnO_3$ and a lithium transition metal (Ni, Co, Mn, and the like) oxide. The OLO realizes high charge and discharge capacity during operation at a high voltage. However, as charge and discharge repeated, the OLO decreases capacity and drops a voltage, since the structure of the $Li_2MnO_3$ and the lithium transition metal oxide changes due to deintercalation of lithium.

A positive active material according to one embodiment may include the overlithiated layered oxide (OLO) where a nano-composite structure of the $Li_2MnO_3$ and lithium transition metal oxide is doped with a cation element that is not Ni, Co, or Mn.

In some embodiments, the doped cation element may contribute to electron donation through an oxidation reduction reaction during charge and discharge of a battery and may suppress structural change of the $Li_2MnO_3$ and $Li(Ni/Co/Mn)O_2$ and stabilize the structure of the OLO. Accordingly, inclusion of the doped cation element may contribute to increase charge and discharge capacity and suppress capacity decrease and structural change of the OLO as charge and discharge repeated and thus, improve cycle-life characteristics of a rechargeable lithium battery when the rechargeable lithium battery is operated at a high voltage.

In some embodiments, an overlithiated layered oxide may be represented by the following Chemical Formula 1.

$$Li_aNi_bCo_cMn_dM_eO_2 \qquad \text{Chemical Formula 1}$$

wherein the above Chemical Formula 1, M is a cation element of V, Ga, Zr, Mg, Al, Ti, Cr, Fe, W, Mo, Si, or a combination thereof, preferably V, Ti, W, Si, or a combination thereof, and even more preferably V.

In some embodiments of the above Chemical Formula 1, $1.1<a<1.5$, $0<b<1$, $0\le c<1$, $0<d<1$, $0<e<1$ and $0.8\le b+c+d+e<1$, and specifically $0.002\le e\le 0.03$. The e indicates the stoichiometric ratio of a cation element, and when the e is within the range, the structure of the OLO may be stabilized through an excellent oxidation reduction reaction during the charge and discharge. Accordingly, cycle-life characteristics of a rechargeable lithium battery may be improved during the operation at a high voltage.

A positive active material according to another embodiment may include an overlithiated layered oxide (OLO) doped with both cation element and anion element. Specifically, the cation element may dope at a position of Ni, Co, Mn and the like, and the anion element may dope at a position of oxygen (O).

When a cation element is doped in a transition metal position inside the OLO structure, and an anion element is doped in an oxygen position, the OLO structure may be stabilized through an excellent oxidation reduction reaction during the charge and discharge and accordingly, increase charge and discharge capacity and suppress capacity decrease and a structure change as charge and discharge repeated and resultantly, suppress a voltage drop as well as improve cycle-life characteristics when a rechargeable lithium battery is operated at a high voltage.

Specifically, an overlithiated layered oxide according to another embodiment may be represented by the following Chemical Formula 2.

$$Li_aNi_bCo_cMn_dM_eO_{2-f}M'_f \qquad \text{Chemical Formula 2}$$

In some embodiments of the above Chemical Formula 2, M is a cation element of V, Ga, Zr, Mg, Al, Ti, Cr, Fe, W, Mo, Si, or a combination thereof, preferably V, Ti, W, Si, or a combination thereof, and even more preferably V.

In some embodiments of the above Chemical Formula 2, M' is an anion element of F, S, Cl, Br, or a combination thereof.

In some embodiments of the above Chemical Formula 2, $1.1<a<1.5$, $0<b<1$, $0\leq c<1$, $0<d<1$, $0<e<1$, $0<f<1$ and $0.8\leq b+c+d+e<1$, specifically $0.002\leq e\leq 0.03$ and $0.01\leq f<1$, and more specifically $0.03\leq f\leq 0.07$.

In some embodiments, the f indicates the stoichiometric ratio of an anion element, and when the f is within the range, the structure of the OLO may be stabilized through an excellent oxidation reduction reaction during the charge and discharge. Accordingly, cycle-life characteristics of a rechargeable lithium battery may not only be improved but also suppressed from a voltage drop when the rechargeable lithium battery is operated at a high voltage.

In some embodiments, the overlithiated layered oxide (OLO) represented by the above Chemical Formula 1 or the above Chemical Formula 2 may be a particle having spherical shape. In some embodiments, the particle may have an average particle diameter (D50) of about 2 μm to about 20 μm, specifically about 2 μm to about 12 μm, and more specifically about 5 μm to about 12 μm. Herein, the average particle diameter (D50) indicates a diameter of particles corresponding to 50 volume % of all the particles in a particle distribution. When the average particle diameter (D50) is within the range, it is advantageous for electrode plate processibility with high pellet density and without particulate formation.

In some embodiments, the overlithiated layered oxide (OLO) represented by the above Chemical Formula 1 may be prepared according to the following method that includes:

mixing a nickel (Ni) source, a manganese (Mn) source, and a cation doping material (M) source to obtain a source mixture; dispersing the source mixture to obtain a dispersed material; drying the dispersed material to obtain a cation-doped precursor; mixing the cation-doped precursor and lithium (Li) source to obtain a mixture; and heat-treating the mixture overlithiated layered oxide (OLO) represented by the above Chemical Formula 1.

In some embodiments, the overlithiated layered oxide (OLO) represented by the above Chemical Formula 2 may be prepared according to the following method that includes:

In some embodiments, an overlithiated layered oxide (OLO) represented by the above Chemical Formula 2 may be obtained by mixing a nickel (Ni) source, a manganese (Mn) source, and a cation doping material (M) source to obtain a source mixture; dispersing the source mixture to obtain a dispersed material; drying the dispersed material to obtain a cation-doped precursor; mixing the cation-doped precursor, a lithium (Li) source, and an anion doping material (M') source to obtain a mixture; and heat-treating the mixture.

Unlike the method of preparing the co-precipitation precursor of a transition metal and mixing the co-precipitation precursor with a cation doping material source, according to one embodiment, a transition metal source may be mixed with the cation doping material source to obtain a precursor in which a transition metal a doping material are uniformly mixed. Accordingly, a primary particle may more uniformly grow.

In some embodiments, the mixed source mixture may be obtained by further mixing a cobalt (Co) source.

In some embodiments, the nickel (Ni) source, the manganese (Mn) source, the cobalt (Co) source may be acetate, nitrate, hydroxide, oxide, sulfate, and the like that include each Ni, Mn, and Co metal, but are not limited thereto.

In some embodiments, the cation doping material (M) source may be nitrate, oxide, chloride, acid ammonium, and the like that include a cation element, but is not limited thereto.

In some embodiments, the lithium (Li) source may be lithium carbonate, lithium acetate, lithium hydroxide, and the like.

In some embodiments, the anion doping material (M') source may be LiF, and the like, but is not limited thereto.

In some embodiments, the cation doping material (M) source may be mixed in an amount of about 1 mol % to about 3 mol %, and specifically about 0.5 mol % to about 1 mol % based on total amount of the source mixture. When the cation doping material (M) source is mixed within the range, the structure of the OLO may be stabilized through an excellent oxidation reduction reaction during the charge and discharge. Accordingly, charge and discharge capacity of a rechargeable lithium battery may be increased and cycle-life characteristics of the rechargeable lithium battery during operation at a high voltage may be improved.

In some embodiments, the anion doping material (M') source may be mixed in an amount of about 1 parts by mole to about 11 parts by mole, and specifically about 3 parts by mole to about 9 parts by mole based on 100 parts by mole of the source mixture. When the anion doping material (M') source is mixed within the range, the structure of the OLO may be stabilized through an excellent oxidation reduction reaction during the charge and discharge. Accordingly, cycle-life characteristics of a rechargeable lithium battery may not only be improved during operation at a high voltage but voltage drop of the rechargeable lithium battery may also be suppressed.

In some embodiments, the dispersing may be performed using a milling method.

In some embodiments, the milling method may use a ball mill, beads mill, and the like, without limitation. In some embodiments, the dispersed material may have a size of about 5 nm to about 100 nm, and specifically about 10 nm to about 50 nm. When the dispersed material has a size within the range, electrode plate processibility may be improved due to a high pellet density and no particulate formation.

In some embodiments, the dispersing may be performed for about 1 hour to 3 hours, and specifically about 1.5 hours to about 2 hours. When the dispersion is performed within the above time, the precursor and the doping material may be uniformly dispersed in a very small size and well doped inside the structure.

In some embodiments, the drying may be performed using a spray drying method.

In some embodiments, the spray drying method may be performed with about 5 mm/min to about 30 mm/min, and specifically about 10 mm/min to about 15 mm/min. In some embodiments, the spray drying method may be performed at a temperature of about 150° C. to about 300° C., and specifically about 200° C. to about 300° C. When the spray drying method is performed within the speed and a temperature range, a transition metal source and a cation doping material source are uniformly mixed in a precursor. Accordingly, the doping material may be uniformly doped inside a crystalline structure.

In some embodiments, the heat-treating may be performed at a temperature of about 600° C. to about 900° C., and specifically about 700° C. to about 750° C. When the heat-treating is performed within the temperature range, excellent crystallinity without an impurity phase may be obtained. In some embodiments, the heat-treating may be performed for about 5 hours to about 15 hours, and specifically about 10 hours to about 12 hours under an air or nitrogen atmosphere.

Hereinafter, a rechargeable lithium battery including the positive active material is illustrated referring to FIG. 1.

FIG. 1 is a schematic view showing the lithium rechargeable battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the negative electrode 112 and the positive electrode 114, an electrolyte (not shown) impregnating the separator 113, a battery case 120 including the electrode assembly, and a sealing member 140 sealing the battery case 120.

In some embodiments, the positive electrode 114 includes a current collector and a positive active material layer disposed on the current collector. In some embodiments, the positive active material layer includes a positive active material, a binder, and optionally a conductive material.

In some embodiments, the current collector may be aluminum (Al), but is not limited thereto.

The positive active material is the same as described above.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be one or more of natural graphite, artificial graphite, carbon black, acetylene black, ketjen black, a carbon fiber, a metal powder, or a metal fiber of copper, nickel, aluminum, silver, and the like, and a conductive material such as a polyphenylene derivative and the like.

In some embodiments, the negative electrode 112 includes a current collector and a negative active material layer disposed on the negative current collector.

In some embodiments, the negative current collector may be a copper (Cu) foil.

In some embodiments, the negative active material layer may include a negative active material, a binder, and optionally a conductive material.

In some embodiments, the negative active material may include a material that reversibly intercalates/deintercalates lithium ions, a lithium metal, a lithium metal alloy, material being capable of doping and dedoping lithium, or a transition metal oxide.

In some embodiments, the material that reversibly intercalates/deintercalates lithium ions may be a carbon material which may be any generally-used carbon-based negative active material in a lithium ion rechargeable battery, and examples thereof may be crystalline carbon, amorphous carbon, or mixtures thereof. The crystalline carbon may be non-shaped, or sheet, flake, spherical, or fiber shaped natural graphite or artificial graphite. In some embodiments, the amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

In some embodiments, the material being capable of doping and dedoping lithium may be Si, $SiO_x$ (0<x<2), a Si—C composite, a Si-Q alloy (wherein Q is an alkali metal, an alkaline-earth metal, Group 13 to 16 elements, a transition metal, a rare earth element, or a combination thereof, and not Si), Sn, $SnO_2$, a Sn—C composite, Sn—R (wherein R is an alkali metal, an alkaline-earth metal, Group 13 to 16 elements, a transition metal, a rare earth element, or a combination thereof, and not Sn), and the like, and at least one of these may be mixed with $SiO_2$. Specific elements of the Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In some embodiments, the transition metal oxide may be vanadium oxide, lithium vanadium oxide, and the like.

The binder improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber, and the like; a metal-based material such as a metal powder or a metal fiber, and the like of copper, nickel, aluminum, silver, and the like; a conductive polymer such as a polyphenylene derivative and the like; or a mixture thereof.

In some embodiments, the negative and positive electrodes 112 and 114 may be manufactured in a method of mixing the active material, a conductive material, and a binder to prepare an active material composition and coating the composition on a current collector, respectively.

The electrode manufacturing method is well known, and thus is not described in detail in the present specification. The solvent includes N-methylpyrrolidone and the like, but is not limited thereto.

In some embodiments, the electrolyte includes a non-aqueous organic solvent and a lithium salt.

The non-aqueous organic solvent serves as a medium for transmitting ions taking part in the electrochemical reaction of a battery. In some embodiments, the non-aqueous organic solvent may be selected from a carbonate-based, ester-based, ether-based, ketone-based, alcohol-based, or aprotic solvent.

In some embodiments, the carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

Particularly, when the linear carbonate compounds and cyclic carbonate compounds are mixed, an organic solvent having a high dielectric constant and a low viscosity may be provided. When the cyclic carbonate and the linear carbonate are used, the cyclic carbonate and the linear carbonate are mixed together in a volume ratio ranging from about 1:1 to 1:9.

In some embodiments, the ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, and the like. The ether solvent may be, for example dibutylether, tetraglyme, diglyme, dimethoxyethane, 2-methyltetrahydrofuran, tetrahydrofuran, and the like, and the ketone-based solvent may be cyclohexanone, and the like. In addition, the alcohol based solvent may be ethanol, isopropyl alcohol, and the like.

In some embodiments, the non-aqueous organic solvent may be used singularly or in a mixture, and when the organic solvent is used in a mixture, the mixture ratio may be controlled in accordance with a desirable battery performance.

In some embodiments, the non-aqueous electrolyte may further include an overcharge inhibitor additive such as ethylenecarbonate, pyrocarbonate, or the like.

The lithium salt is dissolved in an organic solvent, supplies lithium ions in a battery, basically operates the rechargeable lithium battery, and improves lithium ion transportation between positive and negative electrodes therein.

Specific examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers of 1 to 20, respectively), LiCl, LiI, $LiB(C_2O_4)_2$ (lithium bis(oxalato) borate), or a combination thereof.

In some embodiments, the lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

In some embodiments, the separator 113 may include any materials commonly used in the conventional lithium battery as long as separating a negative electrode 112 from a positive electrode 114 and providing a transporting passage for lithium ion. In other words, the separator 113 may have a low resistance to ion transportation and an excellent impregnation for an electrolyte. For example, it may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the present disclosure is illustrated in more detail with reference to examples. However, these examples are exemplary, and the present disclosure is not limited thereto.

Furthermore, what is not described in this disclosure may be sufficiently understood by those who have knowledge in this field and will not be illustrated here.

Preparation of Positive Active Material

Example 1

Mixed sources of 22.21 g of $Ni(OH)_2$, 22.27 g of $Co(OH)_2$, 54.82 g of $Mn_3O_4$, and 0.70 g of $NH_4VO_3$ were put in distilled water, and the mixture was uniformly dispersed by using a ball mill (0.3 mm $ZrO_2$ ball) for about 2 hours. Herein, the transition metal sources were appropriately mixed in 40:60 of $Li_2MnO_3:Li(Ni_{0.33}Co_{0.33}Mn_{0.33})O_2$ and 20:20:60 of a mole ratio among Ni:Co:Mn. The $NH_4VO_3$ was included in an amount of 0.5 mol % based on the total amount of the mixed source. The dispersed material was about 100 nm. Subsequently, the dispersed material was spray-dried at about 245° C. for 15 mm/min in a spray-drying method, obtaining a vanadium-doped precursor. Then, the vanadium-doped precursor of 61.78 g was mixed with $Li_2CO_3$ of 38.22 g in a solid-phase synthesis method. The mixture was heat-treated at 750° C. for 10 hours under an air atmosphere, preparing a positive active material, $Li_{1.170}Ni_{0.164}Co_{0.167}Mn_{0.498}V_{0.005}O_2$. The positive active material had particles having spherical shape, and the particle had an average particle diameter (D50) of about 6 μm.

Example 2

A positive active material, $Li_{1.170}Ni_{0.164}Co_{0.167}Mn_{0.498}V_{0.001}O_2$, was prepared according to the same method as Example 1 except for using 22.06 g of $Ni(OH)_2$, 22.11 g of $Co(OH)_2$, 54.44 g of $Mn_3O_4$, and 1.39 g of $NH_4VO_3$, for using 1.0 mol % of the $NH_4VO_3$ based on the total amount of the mixed source, and for using 61.97 g of the vanadium-doped precursor and 38.03 g of $Li_2CO_3$. The positive active material had particles having spherical shape, and the particle had an average particle diameter (D50) of about 6 μm.

Example 3

Mixed sources of 22.21 g of $Ni(OH)_2$, 22.27 g of $Co(OH)_2$, 54.82 g of $Mn_3O_4$, and 0.70 g of $NH_4VO_3$ was put in distilled water, and the mixture was uniformly dispersed by using a ball mill (0.3 mm $ZrO_2$ ball) for about 2 hours. Herein, the transition metal sources were appropriately mixed in 40:60 of $Li_2MnO_3:Li(Ni_{0.33}Co_{0.33}Mn_{0.33})O_2$ and 20:20:60 of a mole ratio among Ni:Co:Mn. In addition, the amount of the $NH_4VO_3$ was 1.0 mol % based on the total amount of the mixed source. The dispersed material was about 100 nm. Subsequently, the dispersed material was spray-dried at about 245° C. and a speed of 15 mm/min in a spray drying method, obtaining a vanadium-doped precursor. Then, the vanadium-doped precursor of 62.06 g was mixed with $Li_2CO_3$ of 36.86 g and LiF of 1.08 g in a solid-phase synthesis method. Herein, the amount of the LiF was 5 mol % based on 100 mole of the total weight of the mixed source. The mixture was heat-treated under an air atmosphere at 750° C. for 10 hours, obtaining a positive active material, $Li_{1.170}Ni_{0.162}Co_{167}Mn_{0.495}V_{0.01}O_{1.95}F_{0.05}$. The positive active material had particles having spherical shape, and the particle had an average particle diameter (D50) of about 6 μm.

Example 4

A positive active material, $Li_{1.170}Ni_{0.164}Co_{0.167}Mn_{0.498}V_{0.005}O_{1.95}F_{0.05}$, was prepared according to the same method as Example 3 except for using 22.21 g of $Ni(OH)_2$, 22.27 g of $Co(OH)_2$, 54.82 g of $Mn_3O_4$, and 0.70 g of $NH_4VO_3$, for using 0.5 mol % of the $NH_4VO_3$ based on the total amount of the mixed source and heat-treating the mixture at 700° C. The positive active material had particles having spherical shape, and the particle had an average particle diameter (D50) of about 6 μm.

Example 5

A positive active material, $Li_{1.170}Ni_{0.162}Co_{0.167}Mn_{0.495}V_{0.01}O_{1.95}F_{0.05}$, was prepared according to the same method as Example 3 except for heat-treating the mixture at 700° C. The positive active material had particles having spherical shape, and the particle had an average particle diameter (D50) of about 6 μm.

Example 6

A mixed source of 22.21 g of $Ni(OH)_2$, 22.27 g of $Co(OH)_2$, 54.82 g of $Mn_3O_4$, and 0.3 g of $SiO_2$ was put in distilled water, and the mixture was uniformly dispersed by using a ball mill (0.3 mm $ZrO_2$ ball) for about 2 hours. Herein, the transition metal sources were appropriately mixed in 40:60 of $Li_2MnO_3:Li(Ni_{0.33}Co_{0.33}Mn_{0.33})O_2$ and 20:20:60 of a mole ratio among Ni:Co:Mn. In addition, the amount of the $SiO_2$ was 0.5 mol % based on the total amount of the mixed source. The dispersed material was about 100 nm. Subsequently, the dispersed material was spray-dried at about 245° C. and a speed of 15 mn/mm in a spray drying method, obtaining a vanadium-doped precursor. Subsequently, the vanadium-doped precursor of 62.06 g was mixed with $Li_2CO_3$ of 36.86 g and LiF of 1.08 g in a solid-phase synthesis method. Herein, the amount of LiF was 5 mol % based on 100 mole of the total weight of the mixed source. The mixture was heat-treated at 700° C. for 10 hours under an air atmosphere, obtaining a positive active material, $Li_{1.170}Ni_{0.164}Co_{0.167}Mn_{0.498}Si_{0.005}O_{1.95}F_{0.05}$. The positive active material had particles having spherical shape, and the particle had an average particle diameter (D50) of about 6 μm.

Example 7

Mixed sources of 22.21 g of $Ni(OH)_2$, 22.27 g of $Co(OH)_2$, 54.82 g of $Mn_3O_4$, and 1.16 g of $WO_3$ were put in distilled water, and the mixture was uniformly dispersed by using a ball mill (0.3 mm $ZrO_2$ ball) for about 2 hours. Herein, the transition metal sources were appropriately mixed in 40:60 of $Li_2MnO_3:Li(Ni_{0.33}Co_{0.33}Mn_{0.33})O_2$ and 20:20:60 of a mole ratio among Ni:Co:Mn. In addition, the amount of the $WO_3$ was 0.5 mol % based on the total amount of the mixed source. The dispersed material was about 100 nm. Subsequently, the dispersed material was spray-dried at about 245° C. and a speed of 15 mm/min in a spray drying method, obtaining a vanadium-doped precursor. Then, the vanadium-doped precursor of 62.06 g was mixed with $Li_2CO_3$ of 36.86 g and LiF of 1.08 g in a solid-phase synthesis method. Herein, the amount of LiF was 5 mol % based on 100 mol % of the total amount of the mixed source. The mixture was heat-treated under an air atmosphere at 700° C. for 10 hours, preparing a positive active material, $Li_{1.170}Ni_{0.164}Co_{0.167}Mn_{0.498}W_{0.005}O_{1.95}F_{0.05}$. The positive active material had particles having spherical shape, and the particle had an average particle diameter (D50) of about 6 μm.

Example 8

A positive active material, $Li_{1.170}Ni_{0.162}Co_{0.167}Mn_{0.495}W_{0.01}O_{1.95}F_{0.05}$, was prepared according to the same method as Example 7 except for using 22.06 g of $Ni(OH)_2$, 22.21 g of $Co(OH)_2$, 54.44 g of $Mn_3O_4$, and 2.31 g of $WO_3$, for using 1.0 mol % of the $WO_3$ based on the total amount of the mixed source, and for using 62.26 g of the vanadium-doped precursor, 36.67 g of $Li_2CO_3$, and 1.07 g of LiF. The positive active material had particles having spherical shape, and the particle had an average particle diameter (D50) of about 6 μm.

Example 9

Mixed sources of 22.21 g of $Ni(OH)_2$, 22.27 g of $Co(OH)_2$, 54.82 g of $Mn_3O_4$, and 0.4 g of $TiO_2$ was dispersed in distilled water, and the mixture was uniformly dispersed by using a ball mill (0.3 mm $ZrO_2$ ball) for about 2 hours. Herein, the transition metal sources were appropriately mixed in 40:60 of $Li_2MnO_3:Li(Ni_{0.33}Co_{0.33}Mn_{0.33})O_2$ and 20:20:60 of a mole ratio among Ni:Co:Mn. In addition, 0.5 mol % of the $TiO_2$ was added based on the total amount of the mixed source. The dispersed material was about 100 nm. Subsequently, the dispersed material was spray-dried at about 245° C. and a speed of 15 mm/min in a spray drying method, obtaining a vanadium-doped precursor. Then, the vanadium-doped precursor of 62.06 g was mixed with $Li_2CO_3$ of 36.86 g and LiF of 1.08 g in a solid-phase synthesis method. Herein, 6 parts by mole of the LiF was added based on 100 parts by mole of the total weight of the mixed source. The mixture was heat-treated under an air atmosphere at 700° C. for 10 hours, preparing a positive active material, $Li_{1.170}Ni_{0.164}Co_{0.167}Mn_{0.498}Ti_{0.005}O_{1.95}F_{0.05}$. The positive active material had particles having spherical shape, and the particle had an average particle diameter (D50) of about 6 μm.

Example 10

A positive active material, $Li_{1.170}Ni_{0.162}Co_{0.167}Mn_{0.495}Ti_{0.01}O_{1.95}F_{0.05}$, was prepared according to the same method as Example 8 except for using 22.06 g of $Ni(OH)_2$, 22.21 g of $Co(OH)_2$, 54.44 g of $Mn_3O_4$, and 0.8 g of $TiO_2$, and for using 1.0 mol % of the $TiO_2$ based on the total amount of the mixed source. The positive active material had particles having spherical shape, and the particle had an average particle diameter (D50) of about 6 μm.

Comparative Example 1

Each $NiSO_4$, $CoSO_4$, and $MnSO_4$ aqueous solution respectively having each concentration of about 2.4 M were mixed in a mole ratio of 20:20:60, an about 7.5M NaOH of 2880 ml aqueous solution and an about 15 M $NH_4OH$ of 1600 ml aqueous solution were added thereto, and the mixture was consecutively mixed in a co-precipitator. The mixture was co-precipitated at pH 11 for 8 hours at 40° C. and a reaction speed of about 700 rpm, obtaining a $(Ni_{0.2}Co_{0.2}Mn_{0.6})OH_2$ precursor. The precursor was washed, dried in a 120° C. oven, and filtered, and then, mixed with $Li_2CO_3$ in a weight ratio of about 1.0:1.6. The obtained mixture was put in a firing container and fired at a speed of 2° C./min and 900° C. for about 10 hours, preparing a positive active material, $Li_{1.170}Ni_{0.167}Co_{0.167}Mn_{0.500}O_2$.

Comparative Example 2

Each $NiSO_4$, $CoSO_4$, and $MnSO_4$ aqueous solution respectively having each concentration of about 2.4 M was mixed in a mole ratio of 20:20:60, an about 7.5M NaOH of 2880 ml aqueous solution and an about 15 M NH$_4$OH of 1600 ml aqueous solution were added thereto, and the mixture was consecutively mixed in a co-precipitator. The obtained mixture was co-precipitated at pH 11 for 8 hours at 40° C., reaction and a speed about 700 rpm, obtaining a (Ni$_{0.2}$Co$_{0.2}$Mn$_{0.6}$)OH$_2$ precursor. The precursor was washed and dried in a 120° C. oven and then, mixed with Li$_2$CO$_3$ and LiF in a weight ratio of about 60:35:1 with a hand mixer. The obtained mixture was put in a firing container and fired at a speed of 2° C./min and 890° C. for about 10 hours, preparing a positive active material, Li$_{1.170}$Ni$_{0.167}$Co$_{0.167}$Mn$_{0.500}$O$_{1.95}$F$_{0.05}$.

Manufacture of Rechargeable Lithium Battery Cell

A mixture of 92 wt % of each positive active material according to Examples 1 to 10 and Comparative Examples 1 and 2, 4 wt % of polyvinylidene fluoride (PVDF), and 4 wt % of acetylene black were prepared, and the mixture was dispersed in N-methyl-2-pyrrolidone, preparing slurry. The slurry was coated on a 15 μm-thick aluminum foil and then, compressed and dried, manufacturing a positive electrode.

Then, a porous polyethylene separator was interposed between the positive electrode and a negative electrode made of lithium metal, and an electrolyte was injected therein, manufacturing a coin-type half-cell. Herein, the electrolyte was prepared by mixing fluoroethylenecarbonate (FEC), dimethylcarbonate (DMC in a volume ratio of 55:45 and dissolving 1.3M LiPF$_6$ in the mixed solution.

Evaluation 1: SEM Analysis of Positive Active Material

The positive active materials of Example 3 and Comparative Example 2 were analyzed by using a scanning electron microscope (SEM), and the results are provided in FIGS. 2A and 2B and FIGS. 3A and 3B.

Figure 2A:
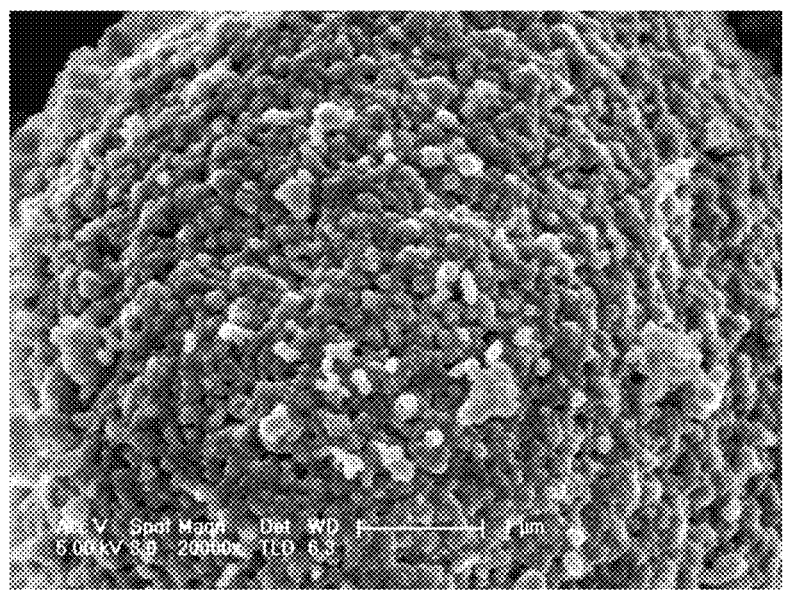
FIGS. 2A and 2B are 20,000-magnification and 40,000-magnification scanning electron microscope (SEM) photographs of the positive active material for a rechargeable lithium battery according to Example 3.
Figure 2B:
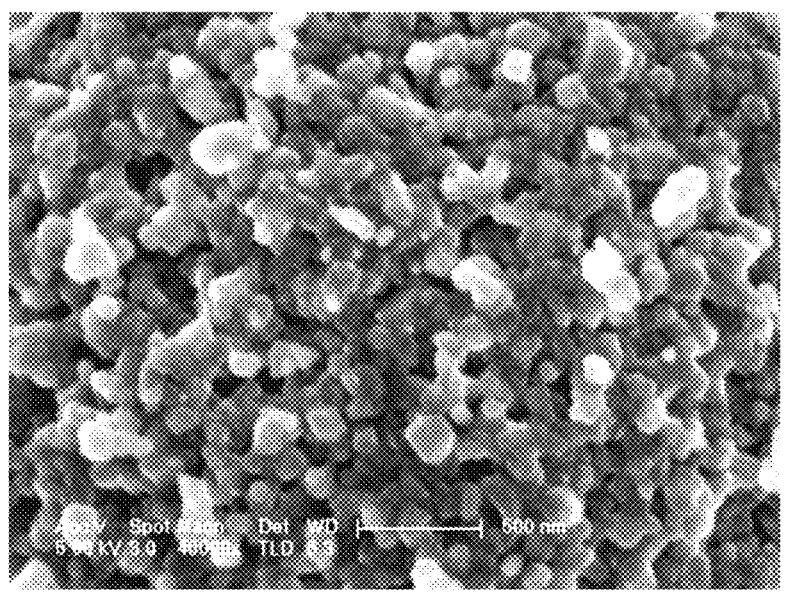
Figure 3A:
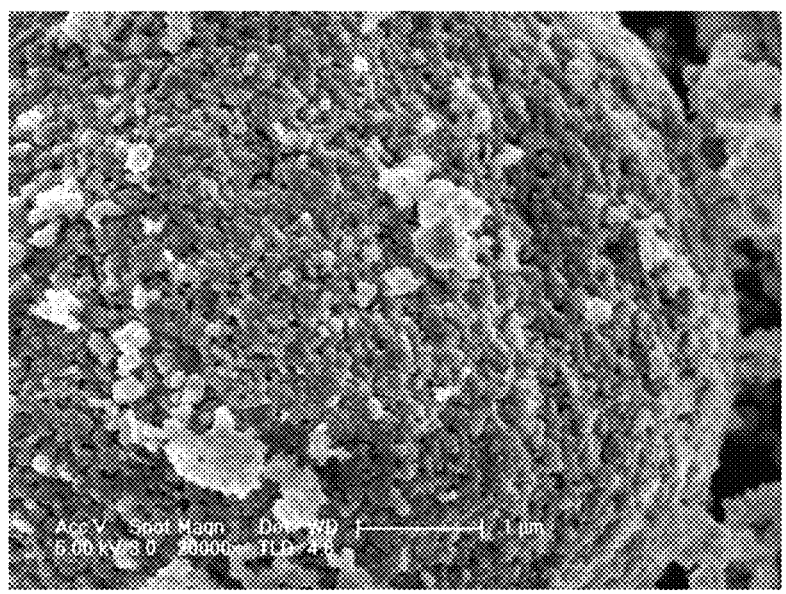
FIGS. 3A and 3B are 20,000-magnification and 40,000-magnification scanning electron microscope (SEM) photographs of the positive active material for a rechargeable lithium battery according to Comparative Example 2.
Figure 3B:
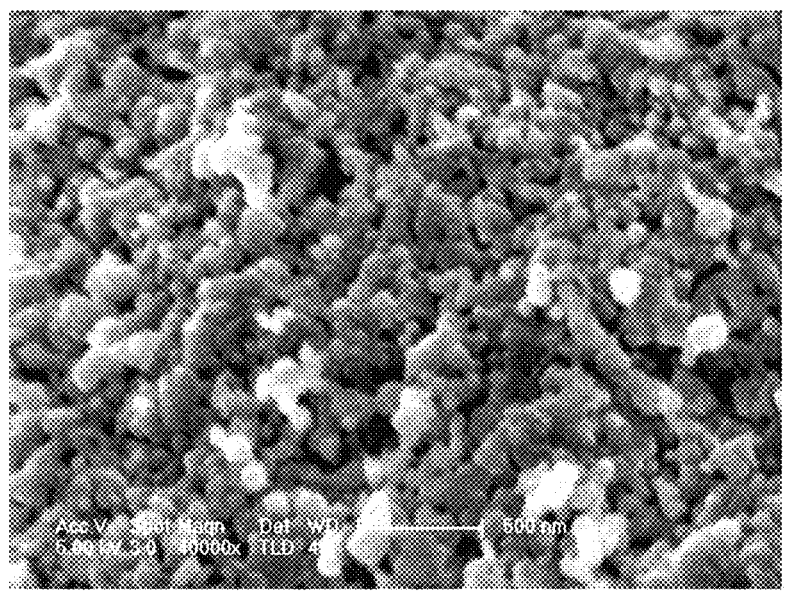

FIGS. 2A and 2B are 20,000-magnification and 40,000-magnification scanning electron microscope (SEM) photographs of the positive active material for a rechargeable lithium battery according to Example 3, and FIGS. 3A and 3B are 20,000-magnification and 40,000-magnification scanning electron microscope (SEM) photographs of the positive active material for a rechargeable lithium battery according to Comparative Example 2.

Referring to FIG. 2A to 3B, an overlithiated layered oxide doped with a cation according to one embodiment had a spherically-shaped secondary particle, whose primary particle was a little larger than that of Comparative Example 2. Specifically, the overlithiated layered oxide was doped with a cation but had no morphology change of a particle.

Figure 4:
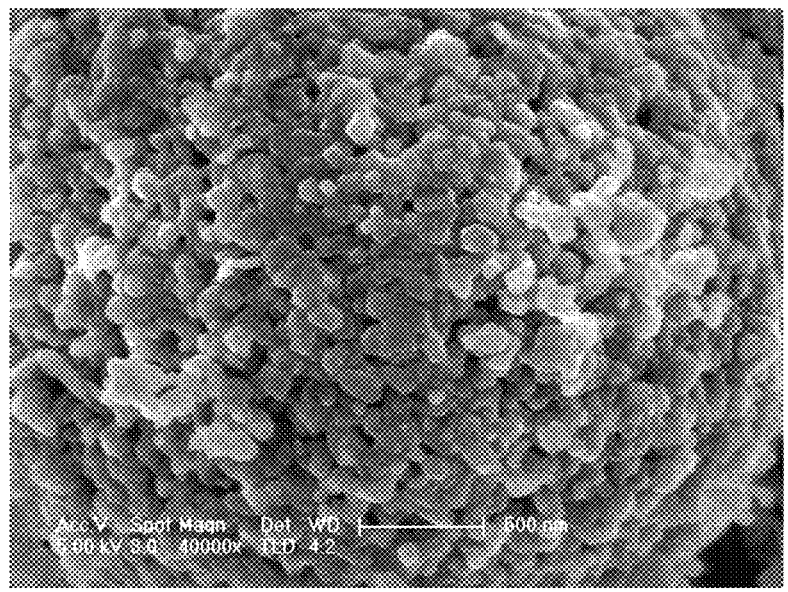
FIGS. 4 and 5 are scanning electron microscope (SEM) photographs of each positive active material for a rechargeable lithium battery according to Examples 4 and 5.
Figure 5:
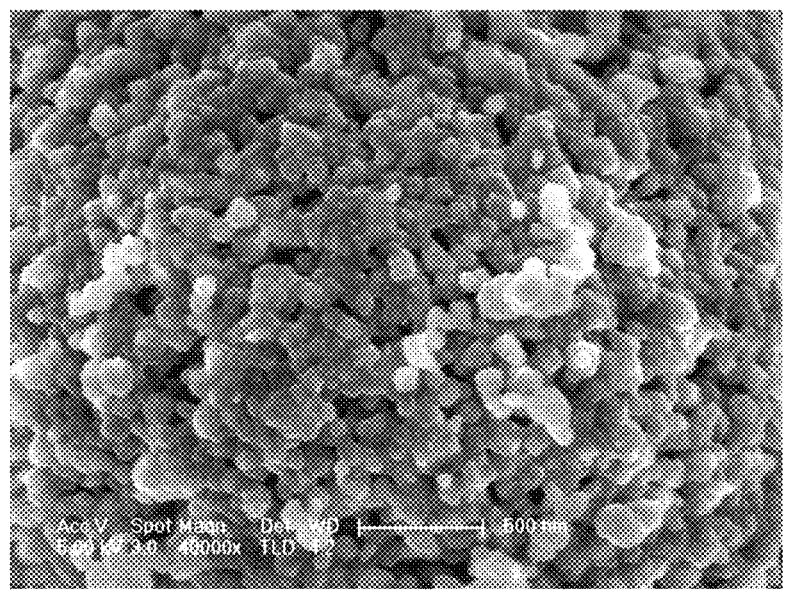

In addition, the positive active materials according to Examples 4 and 5 were analyzed by using a scanning electron microscope (SEM), and the results are provided in FIGS. 4 and 5.

FIGS. 4 and 5 are scanning electron microscope (SEM) photographs of each positive active material for a rechargeable lithium battery according to Examples 4 and 5.

Referring to FIGS. 4 and 5, the overlithiated layered oxide doped with a cation according to one embodiment had a spherically-shaped secondary particle, whose primary particle was a little larger than that of Comparative Example 2.

Evaluation 2: XRD Analysis of Positive Active Material

Figure 6:
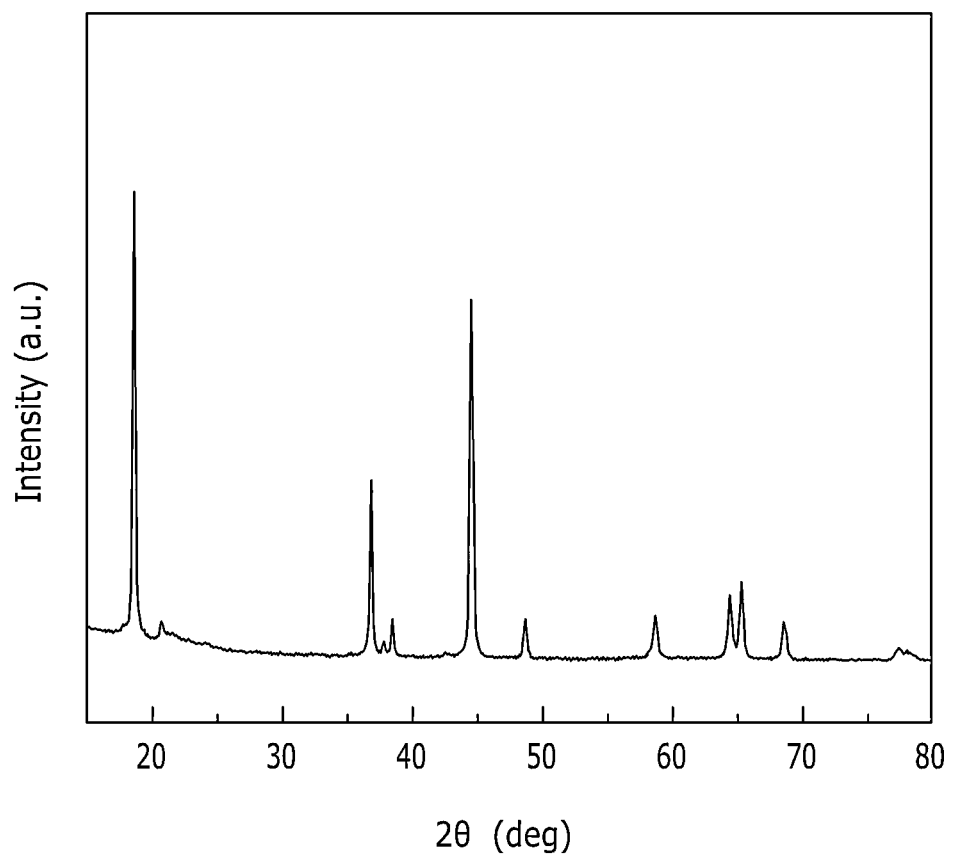
FIG. 6 is an X-ray diffraction analysis (XRD) graph of the positive active material for a rechargeable lithium battery according to Example 3.
Figure 7:
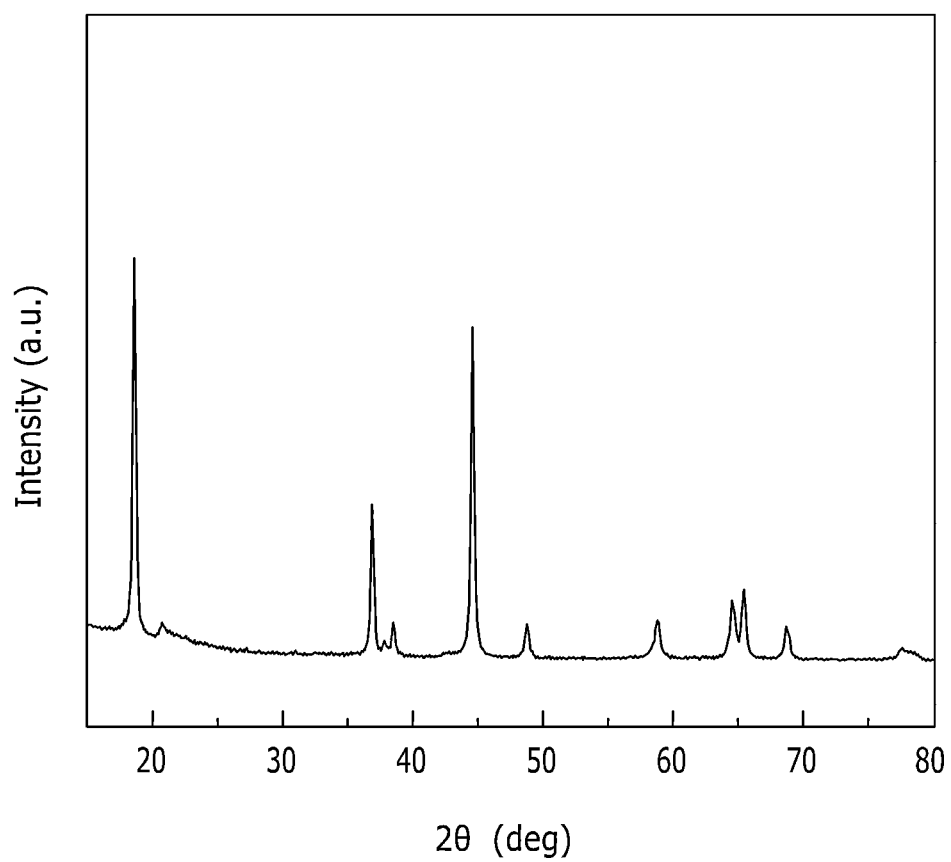
FIG. 7 is an X-ray diffraction analysis (XRD) graph of the positive active material for a rechargeable lithium battery according to Comparative Example 2.

X-ray diffraction analysis (XRD) of the positive active materials according to Example 3 and Comparative Example 2 was performed, and the results are provided in FIGS. 6 and 7.

FIG. 6 is an X-ray diffraction analysis (XRD) graph of the positive active material for a rechargeable lithium battery according to Example 3, and FIG. 7 is an X-ray diffraction analysis (XRD) graph of the positive active material for a rechargeable lithium battery according to Comparative Example 2.

Referring to FIGS. 6 and 7, the overlithiated layered oxide doped with a cation according to one embodiment was doped with a cation but clearly showed a crystal peak of the overlithiated layered oxide, and no impurity phase was examined.

Evaluation 3: Capacity Characteristics of Rechargeable Lithium Battery Cells

Each rechargeable lithium battery cell according to Examples 1 to 10 and Comparative Example 1 was charged and discharged under the same condition, and its capacity characteristic result was provided in the following Table 1.

A formation process was formed by charging the rechargeable lithium battery cells at 0.1 C in a range of 2.5V to 4.7V and discharged at 0.1 C. Herein, initial capacity was obtained by calculating a percentage of discharge capacity relative to charge capacity.

TABLE 1

| | 0.1 C charge capacity (mAh/g) | 0.1 C discharge capacity (mAh/g) | Initial efficiency (%) |
|---|---|---|---|
| Example 1 | 319 | 270 | 84.5 |
| Example 2 | 316 | 262 | 83.1 |
| Example 3 | 309 | 285 | 92.1 |
| Example 4 | 326 | 300 | 92.1 |
| Example 5 | 312 | 289 | 92.7 |
| Example 6 | 302 | 273 | 90.1 |
| Example 7 | 318 | 293 | 92.2 |
| Example 8 | 313 | 288 | 92.1 |
| Example 9 | 319 | 293 | 91.7 |
| Example 10 | 314 | 287 | 91.5 |
| Comparative Example 1 | 315 | 248 | 78.7 |

Referring to Table 1, Examples 1 and 2 using the overlithiated layered oxide doped with a cation according to one embodiment as a positive active material as shown in Chemical Formula 1 and Examples 3 to 10 using a layered oxide doped with a cation and an anion as shown in Chemical Formula 2 showed excellent initial efficiency compared with Comparative Example 1 using an overlithiated layered oxide not doped with a cation.

Evaluation 4: Cycle-Life Characteristics of Rechargeable Lithium Battery Cells

Each rechargeable lithium battery according to Examples 1 to 10 and Comparative Examples 1 and 2 was charged and discharged under the following conditions, and its cycle-life characteristic result was provided in the following Table 2.

After the formation process, the rechargeable lithium battery cells were charged and discharged at 0.1 C in a range of 2.0V to 4.7V, and this charge and discharge cycle was 40 times repeated.

TABLE 2

| | Discharge capacity (mAh/g) | | | | Capacity retention (%) | | |
|---|---|---|---|---|---|---|---|
| | 1st | 10th | 30th | 40th | 10th/1st | 30th/1st | 40th/1st |
| Example 1 | 201 | 196 | 191 | 190 | 97.7 | 95.4 | 94.5 |
| Example 2 | 191 | 186 | 181 | 180 | 97.4 | 95.0 | 94.4 |

TABLE 2-continued

|  | Discharge capacity (mAh/g) | | | | Capacity retention (%) | | |
| --- | --- | --- | --- | --- | --- | --- | --- |
|  | 1st | 10th | 30th | 40th | 10th/1st | 30th/1st | 40th/1st |
| Example 3 | 221 | 215 | 211 | 209 | 97.3 | 95.2 | 94.3 |
| Example 4 | 240 | 234 | 224 | 218 | 97.3 | 93.1 | 90.9 |
| Example 5 | 231 | 225 | 217 | 210 | 97.4 | 98.8 | 90.7 |
| Example 6 | 216 | 209 | 202 | 199 | 96.9 | 93.4 | 92.1 |
| Example 7 | 232 | 224 | 215 | 211 | 96.7 | 92.8 | 91.2 |
| Example 8 | 227 | 220 | 211 | 208 | 96.9 | 93.0 | 91.5 |
| Example 9 | 234 | 225 | 215 | 211 | 96.4 | 92.1 | 92.3 |
| Example 10 | 231 | 223 | 213 | 209 | 96.5 | 92.3 | 90.7 |
| Comparative Example 1 | 178 | 174 | 163 | 159 | 97.6 | 91.3 | 89.5 |
| Comparative Example 2 | 226 | 217 | 207 | 203 | 96.3 | 91.9 | 90.1 |

Referring to Table 2, Examples 1 and 2 using the overlithiated layered oxide doped with a cation according to one embodiment as a positive active material as shown in Chemical Formula 1 and Examples 3 to 10 using a layered oxide doped with a cation and an anion as shown in Chemical Formula 2 showed excellent cycle-life characteristics compared with Comparative Examples 1 and 2 using an overlithiated layered oxide not doped with a cation.

Evaluation 5: Voltage Drop Characteristics of Rechargeable Lithium Battery Cells Each rechargeable lithium battery cells according to Examples 3 to 10 and Comparative Example 2 were charged and discharged as shown in Evaluation 2, and its voltage drop characteristic result was provided in FIGS. 8 to 12.

Figure 8:
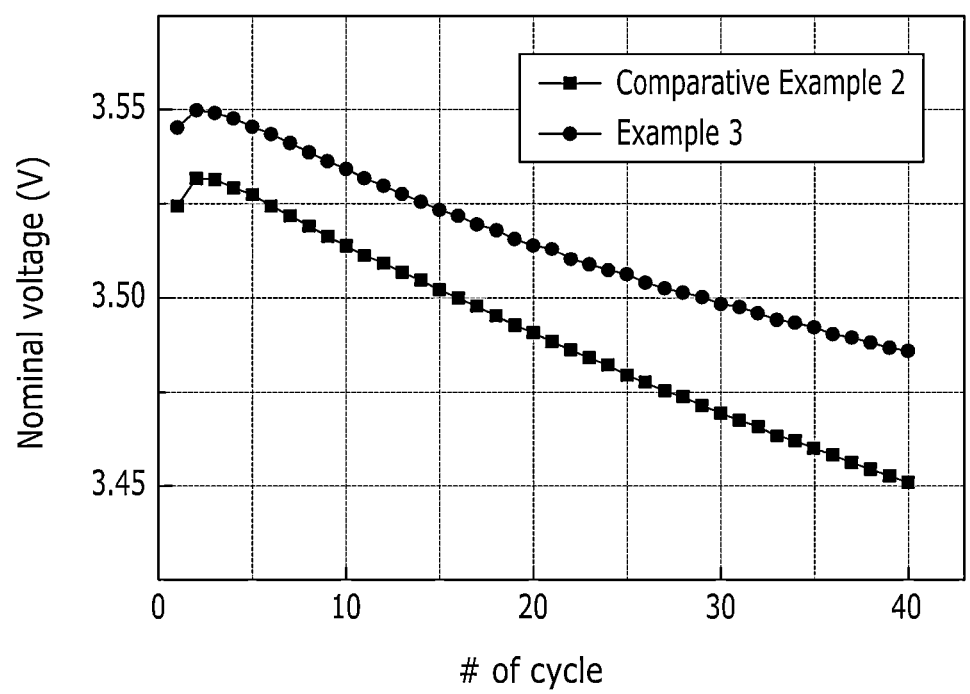
FIG. 8 is a graph showing voltage drop characteristics of the rechargeable lithium battery cells according to Comparative Example 2 and Example 3.
Figure 9:
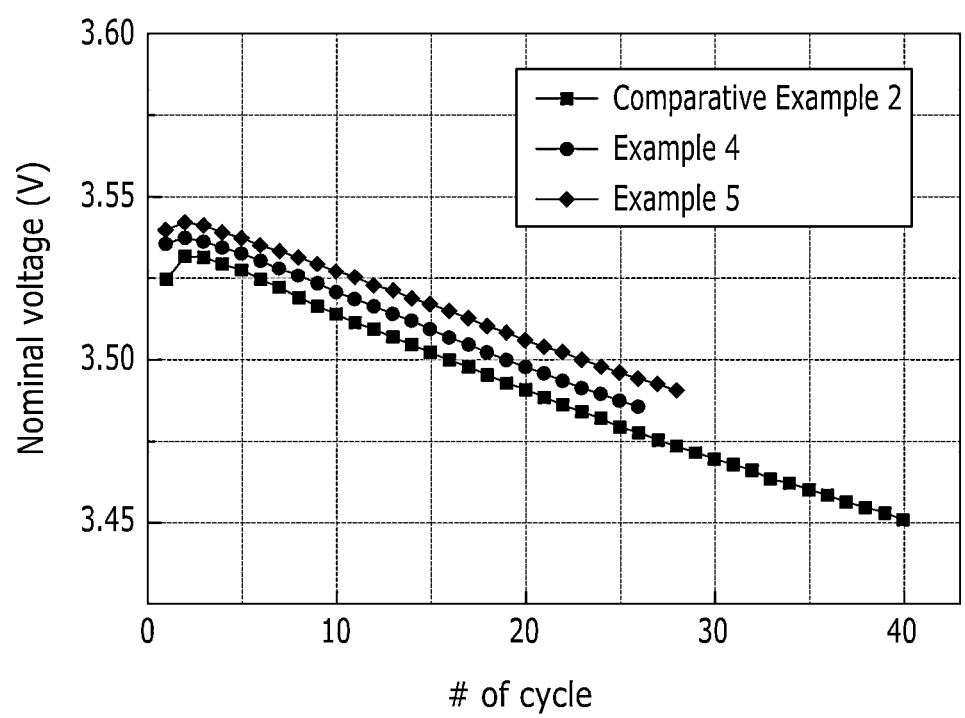
FIG. 9 is a graph showing voltage drop characteristics of the rechargeable lithium battery cells according to Comparative Example 2 and Examples 4 and 5.
Figure 10:
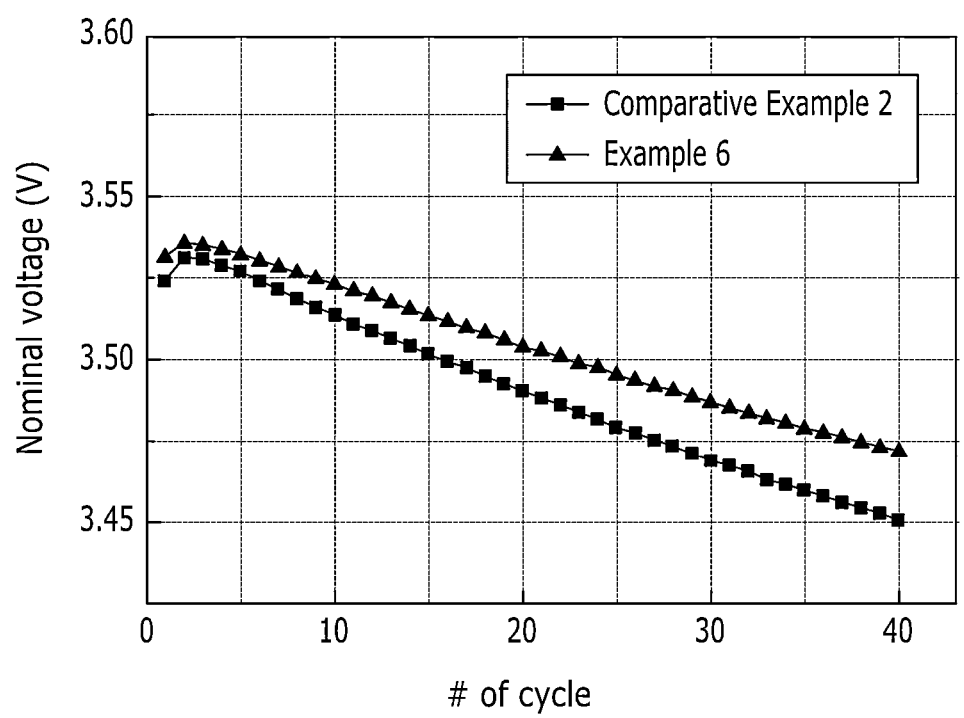
FIG. 10 is a graph showing voltage drop characteristics of the rechargeable lithium battery cells according to Comparative Example 2 and Example 6.
Figure 11:
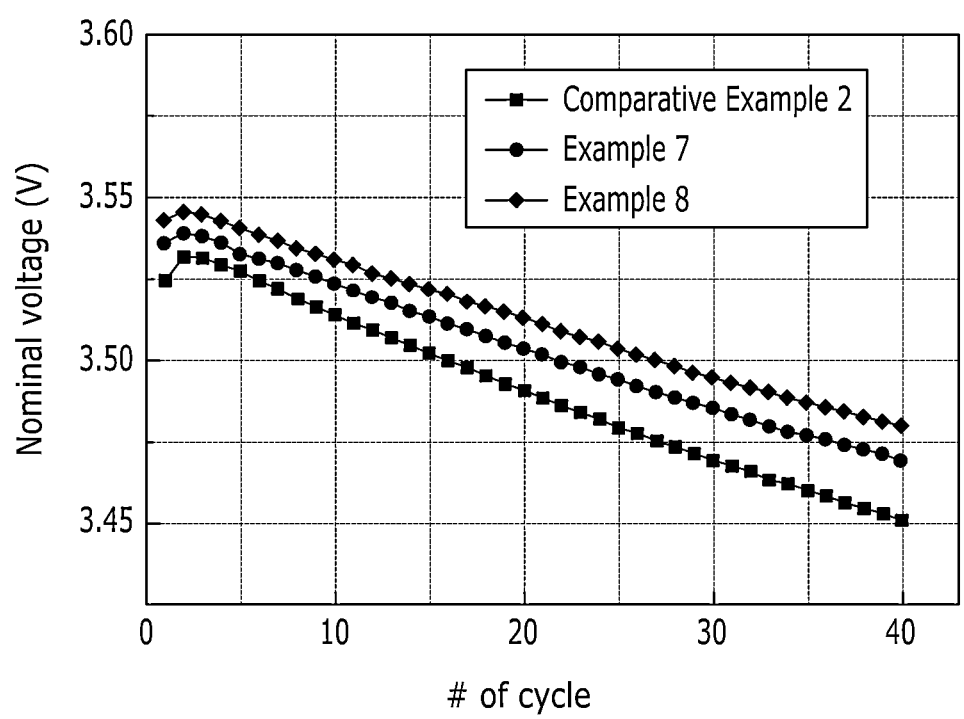
FIG. 11 is a graph showing voltage drop characteristics of the rechargeable lithium battery cells according to Comparative Example 2 and Examples 7 and 8.
Figure 12:
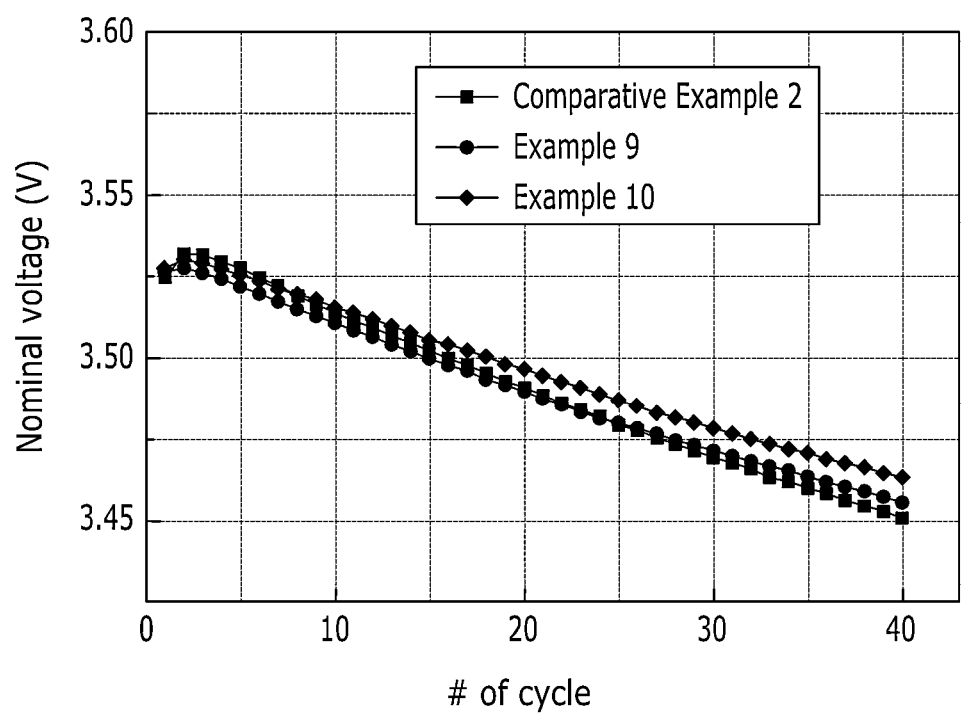
FIG. 12 is a graph showing voltage drop characteristics of the rechargeable lithium battery cells according to Comparative Example 2 and Examples 9 and 10.

FIG. 8 is a graph showing voltage drop characteristics of the rechargeable lithium battery cells according to Comparative Example 2 and Example 3, FIG. 9 is a graph showing voltage drop characteristics of the rechargeable lithium battery cells according to Comparative Example 2 and Examples 4 and 5, FIG. 10 is a graph showing voltage drop characteristics of the rechargeable lithium battery cells according to Comparative Example 2 and Example 6, FIG. 11 is a graph showing voltage drop characteristics of the rechargeable lithium battery cells according to Comparative Example 2 and Examples 7 and 8, and FIG. 12 is a graph showing voltage drop characteristics of the rechargeable lithium battery cells according to Comparative Example 2 and Examples 9 and 10.

Referring to FIGS. 8 to 12, Examples 3 to 10 using a layered oxide doped with a cation and an anion as shown in Chemical Formula 2 were suppressed from voltage drop compared with Comparative Example 2 using an overlithiated layered oxide doped with an anion.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. In the present disclosure, the terms "Example" and "Comparative Example" are used to identify a particular example or experimentation and should not be interpreted as admission of prior art.

What is claimed is:

1. A positive active material for a rechargeable lithium battery comprising an overlithiated layered oxide (OLO) represented by the following Chemical Formula 2:

   Chemical Formula 2 wherein, $1.1 < a < 1.5$, $0 < b < 1$, $0 \leq c < 1$, $0 < d < 1$, $0.002 \leq e \leq 0.03$, $0.03 \leq f \leq 0.07$ and $0.8 \leq b+c+d+e < 1$, M is a cation element of vanadium (V), and M' is an anion element of fluorine (F), wherein the overlithiated layered oxide has a particle having spherical shape, and the particle has an average particle diameter (D50) of about 2 μm to about 12 μm.

2. A rechargeable lithium battery, comprising a positive electrode comprising the positive active material of claim 1;

a negative electrode; and an electrolyte.

* * * * *